Oct. 15, 1935.  I. SIKORSKY  2,017,446
AIRCRAFT AND THREE-POINT LANDING GEAR FOR SAME
Filed April 12, 1929  13 Sheets-Sheet 1
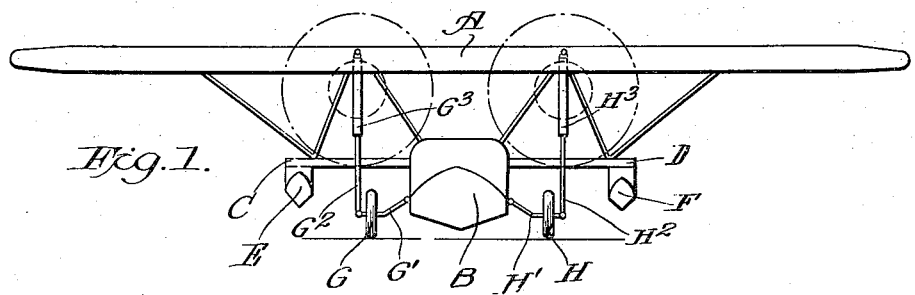
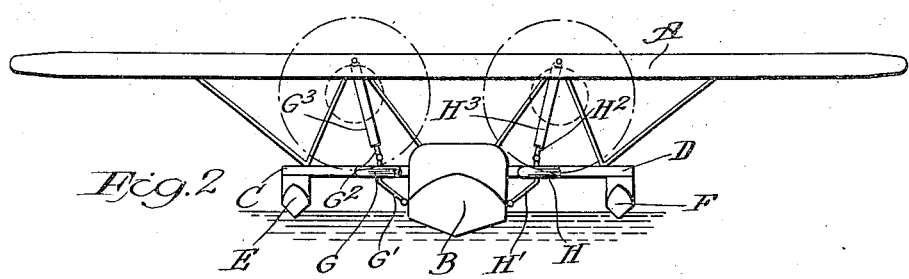
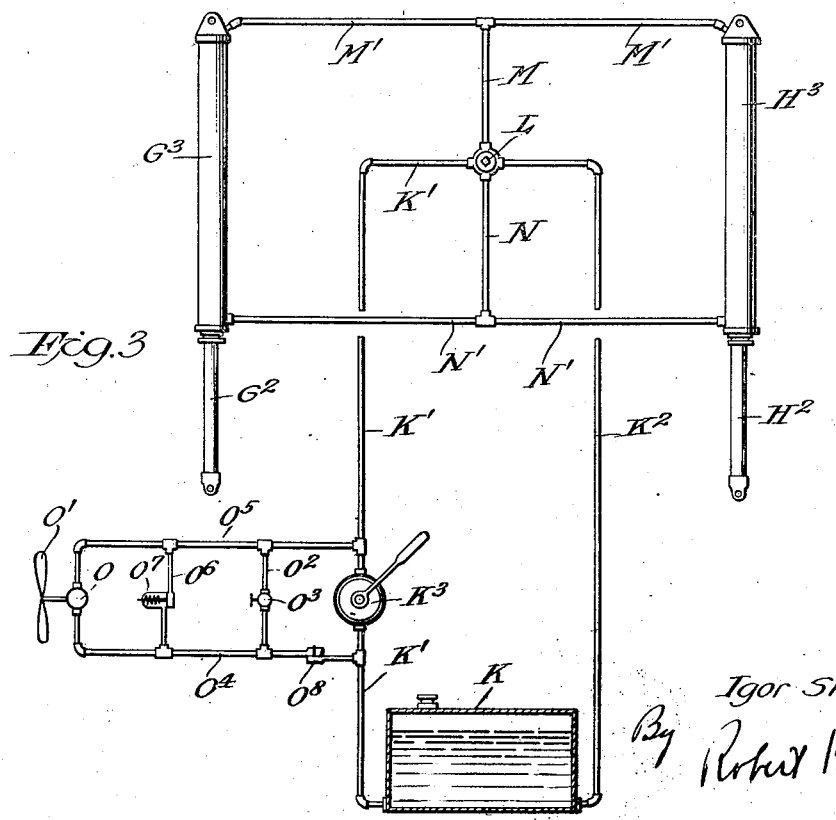
Inventor
Igor Sikorsky
By Robert Kemp
Attorneys

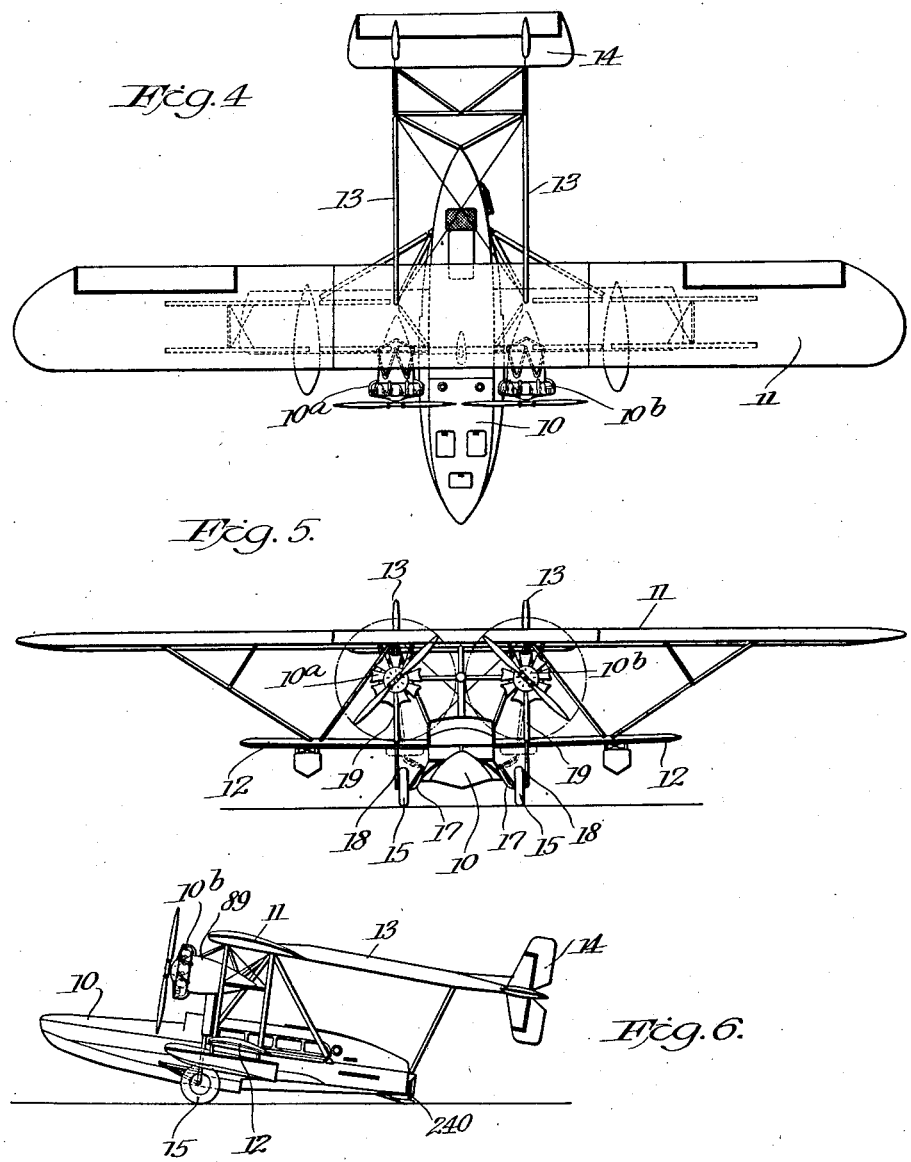

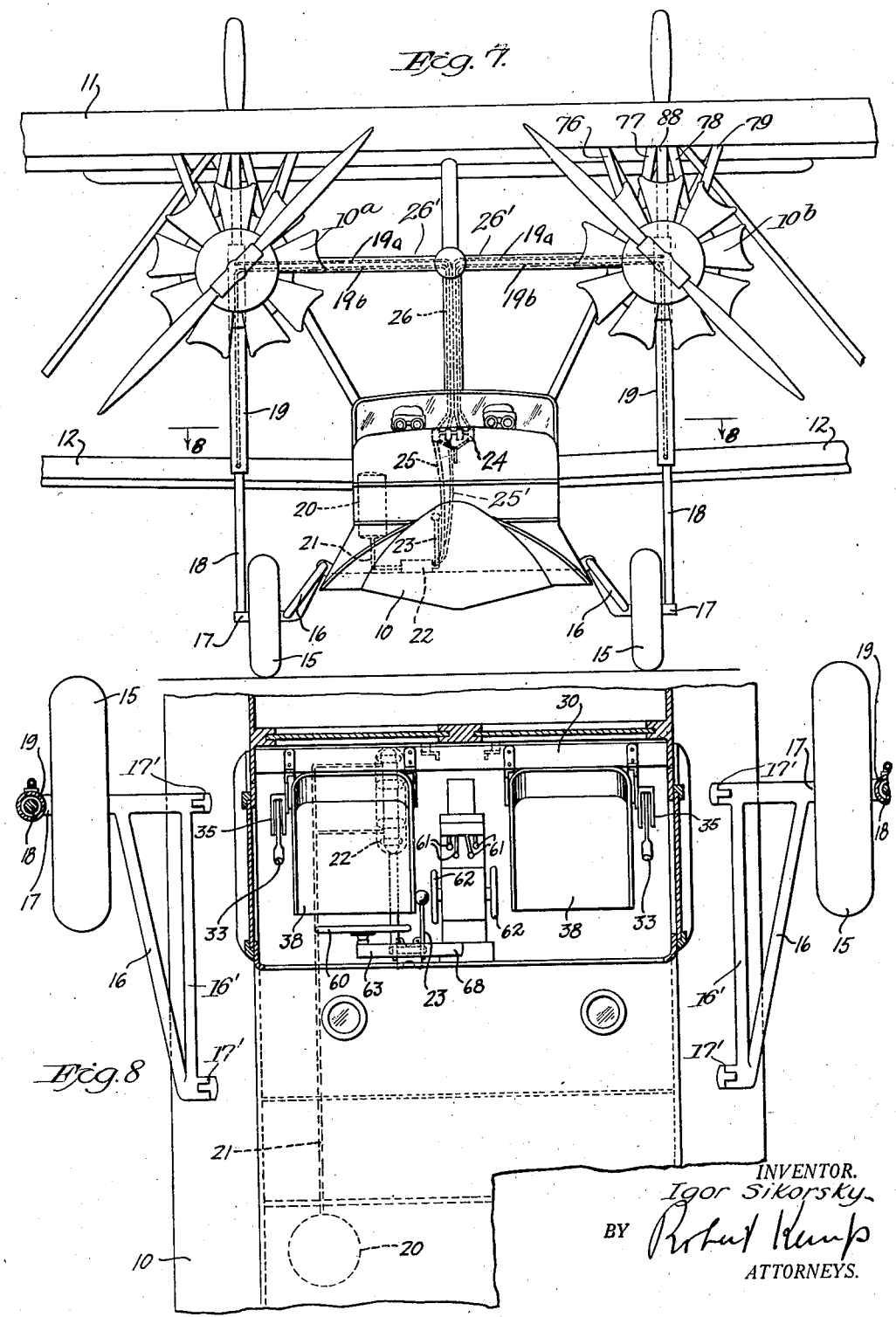

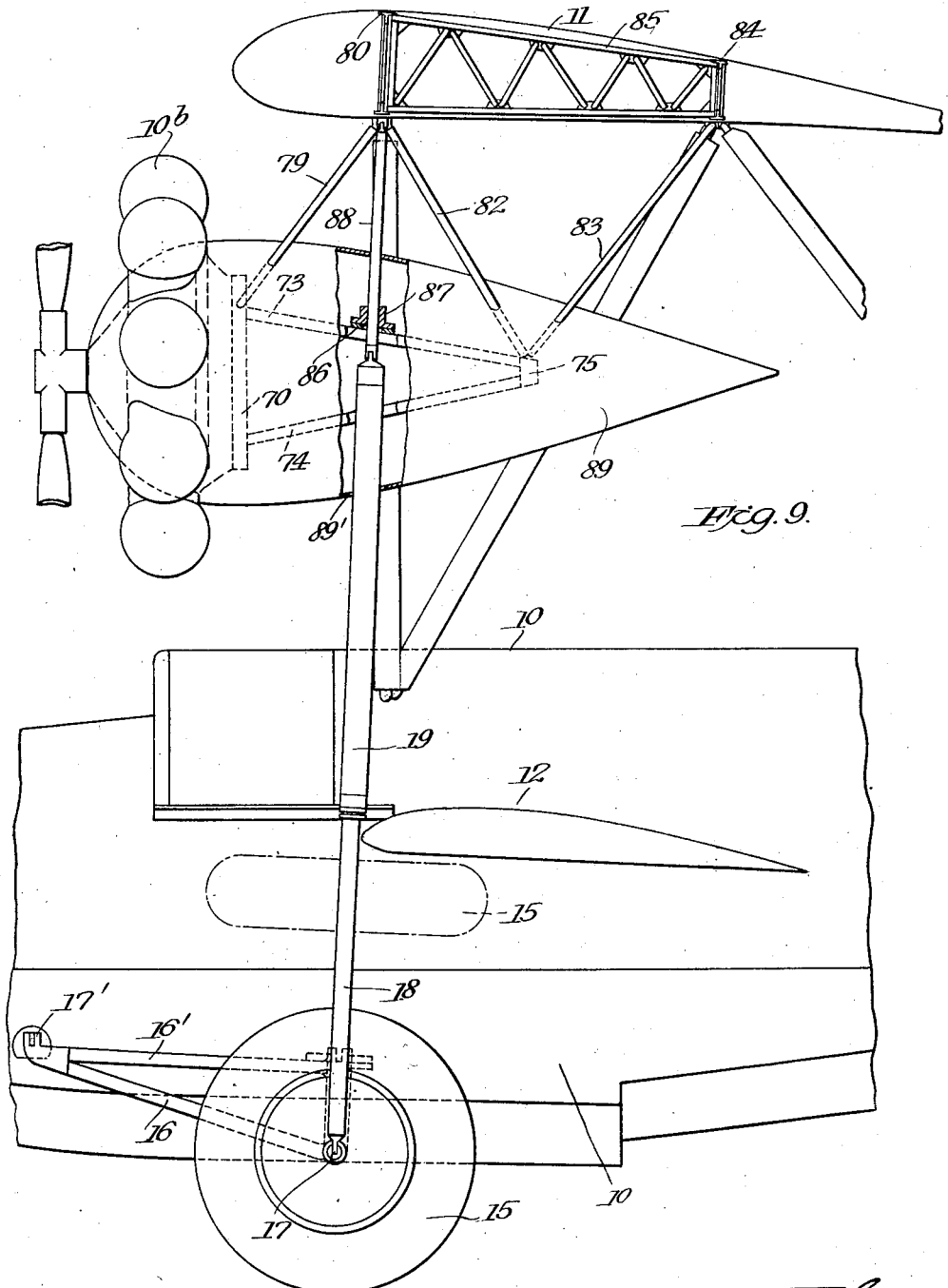

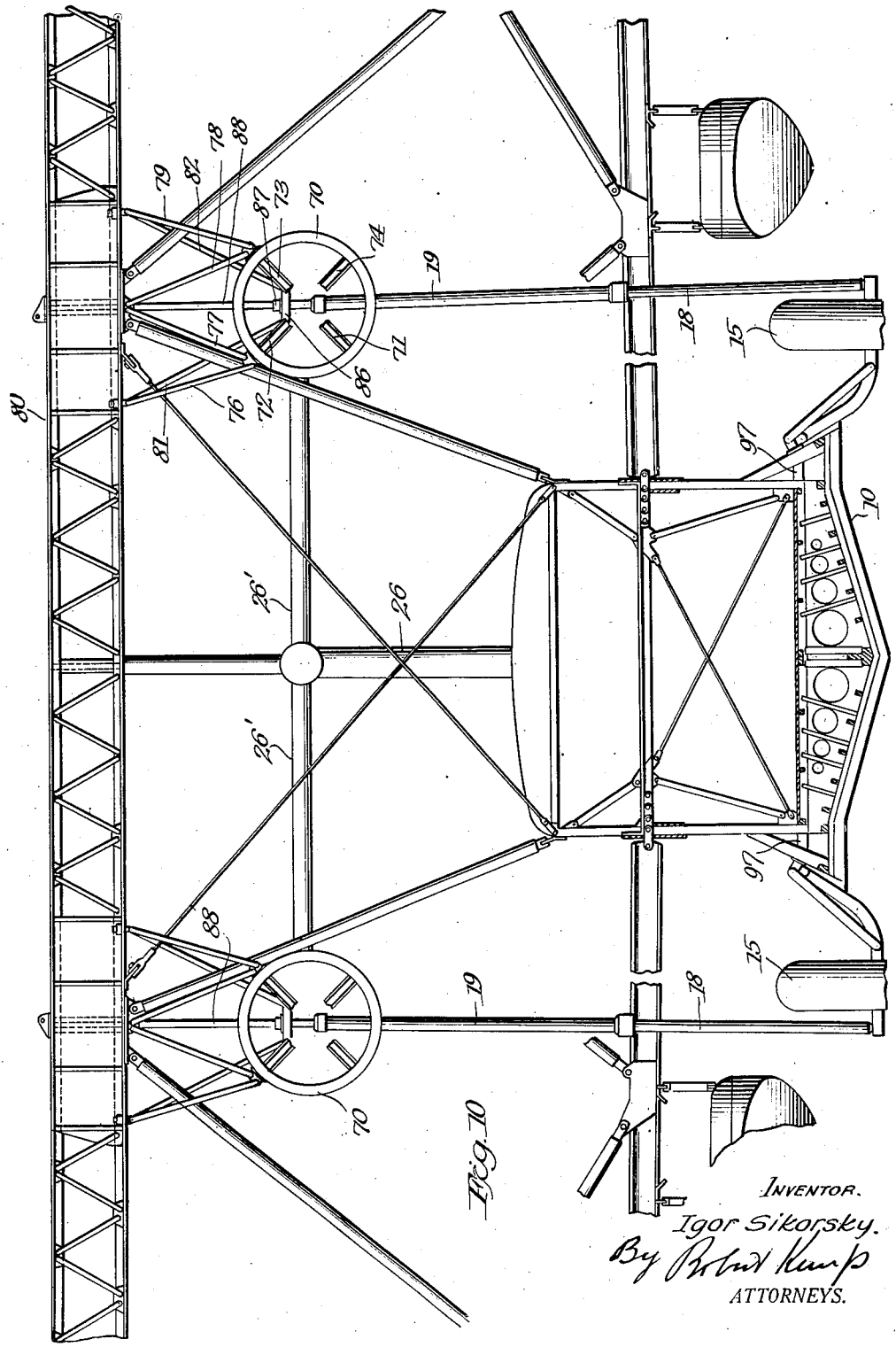

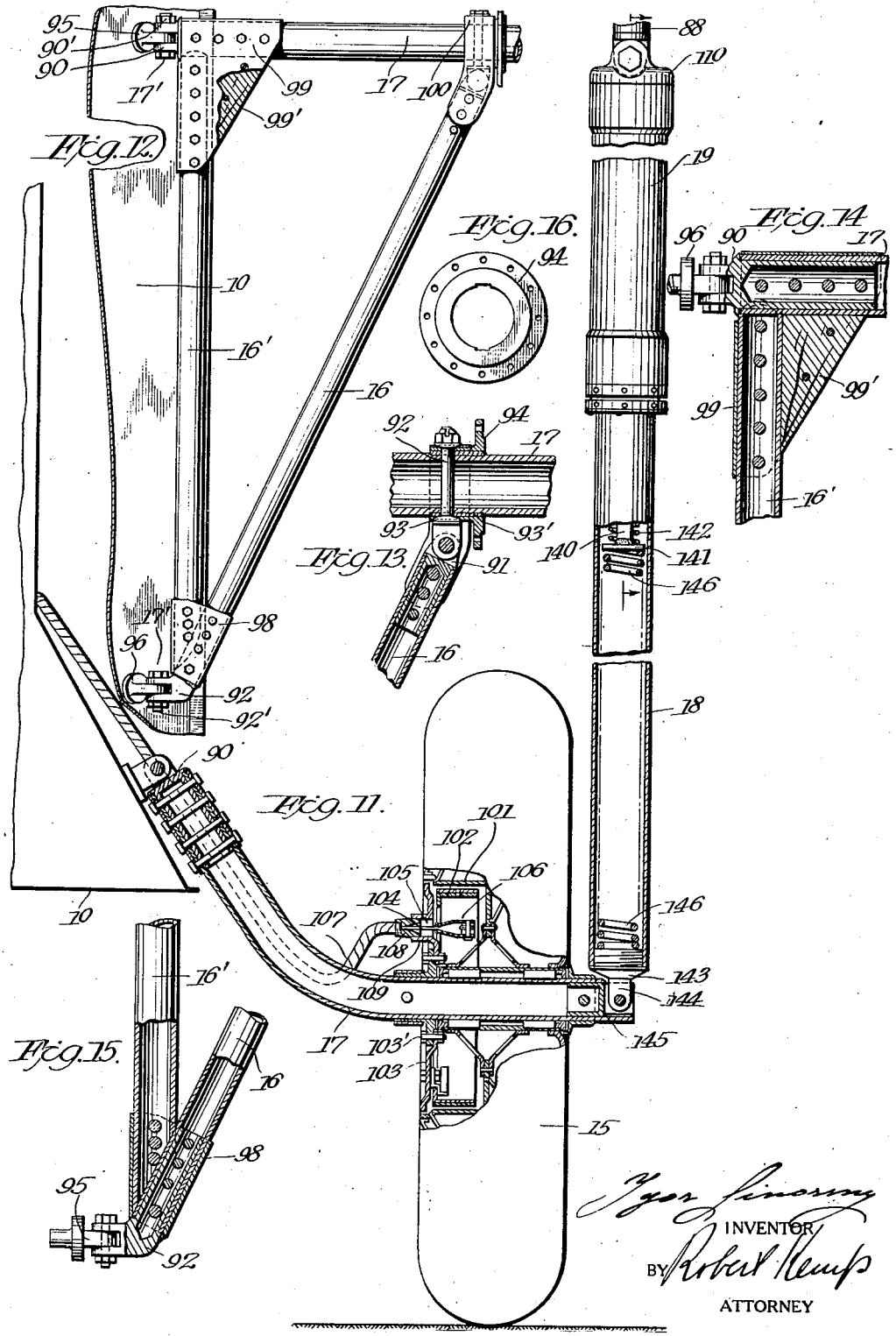

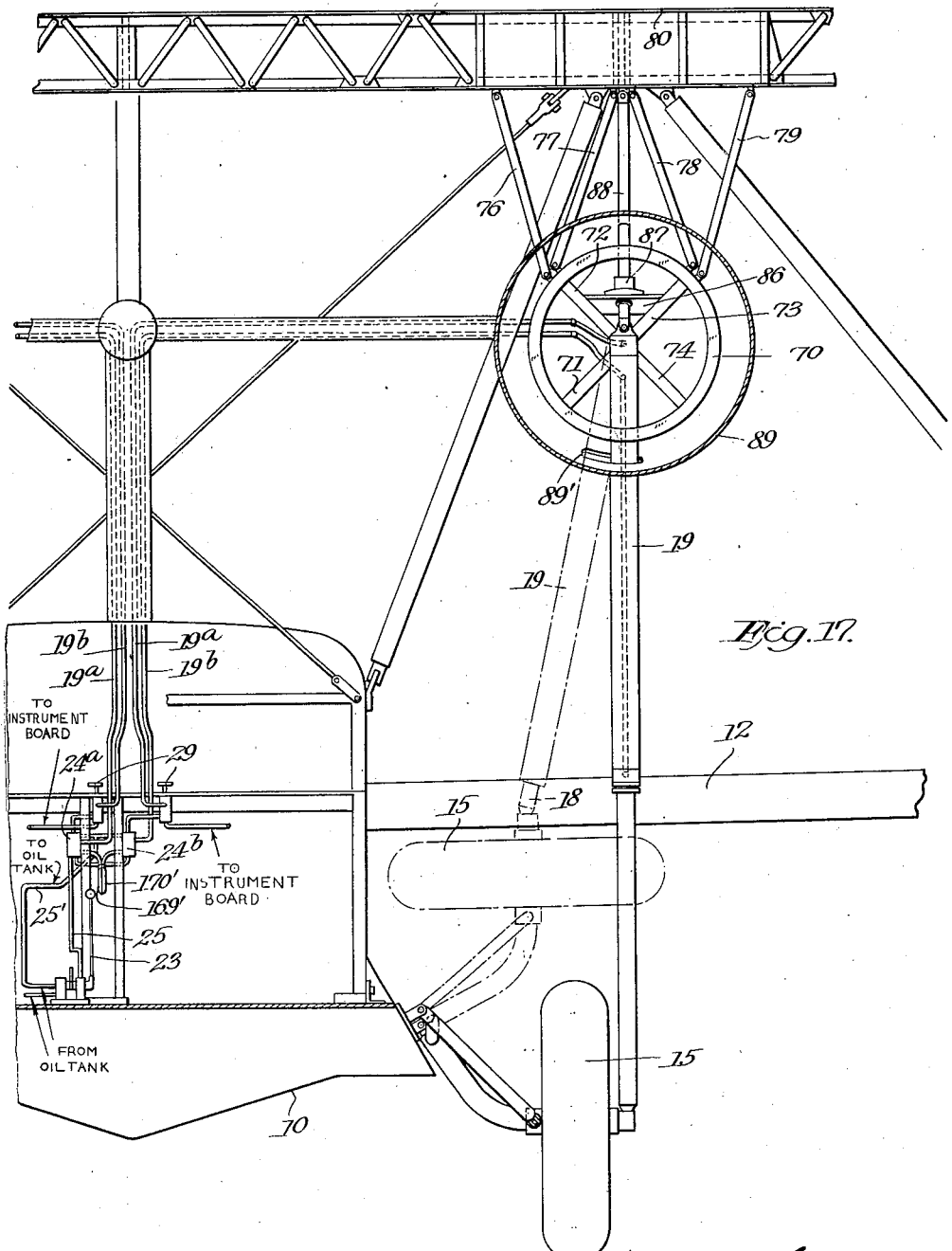

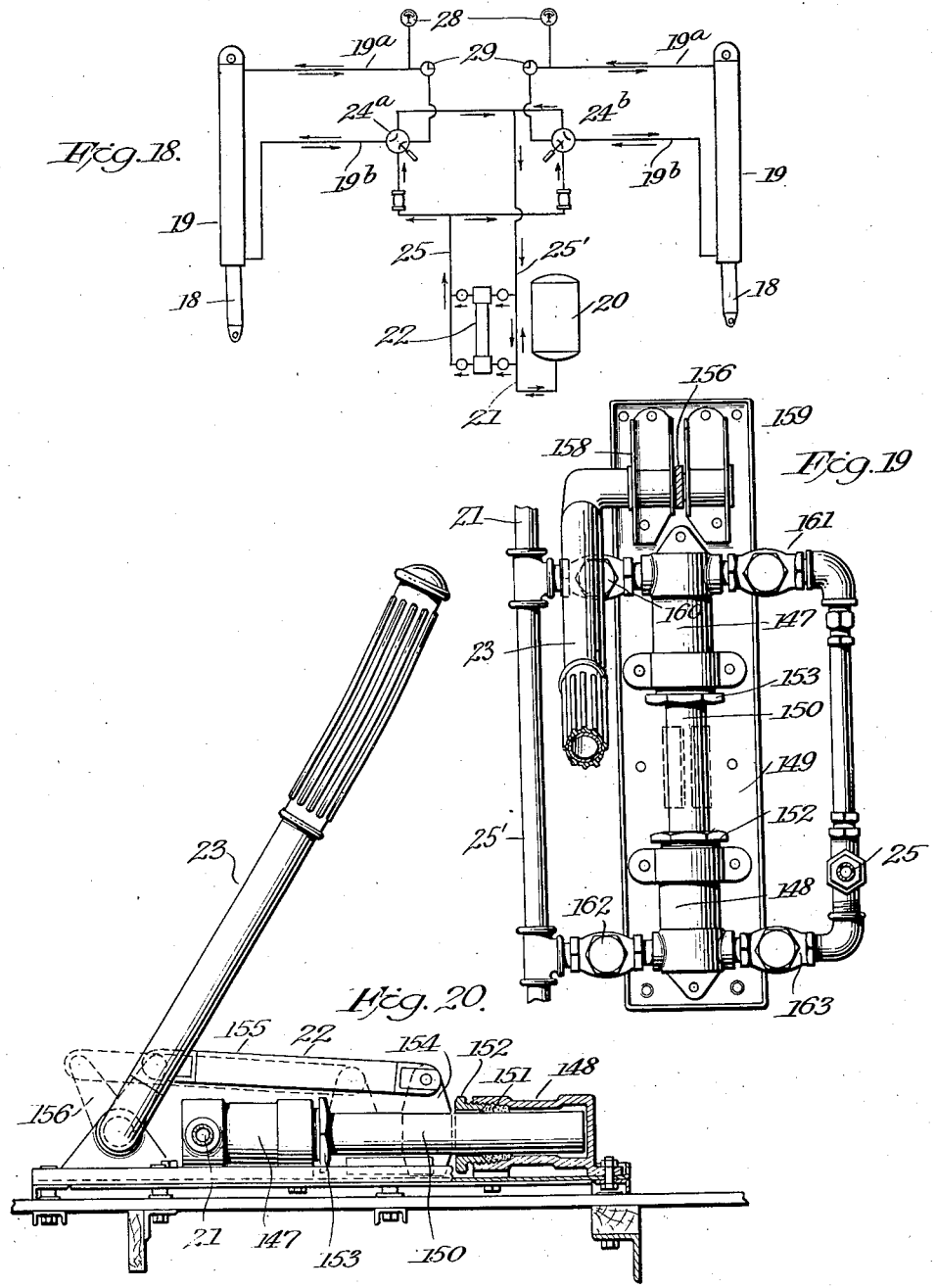

Oct. 15, 1935.                I. SIKORSKY                    2,017,446
           AIRCRAFT AND THREE-POINT LANDING GEAR FOR SAME
                   Filed April 12, 1929      13 Sheets-Sheet 9
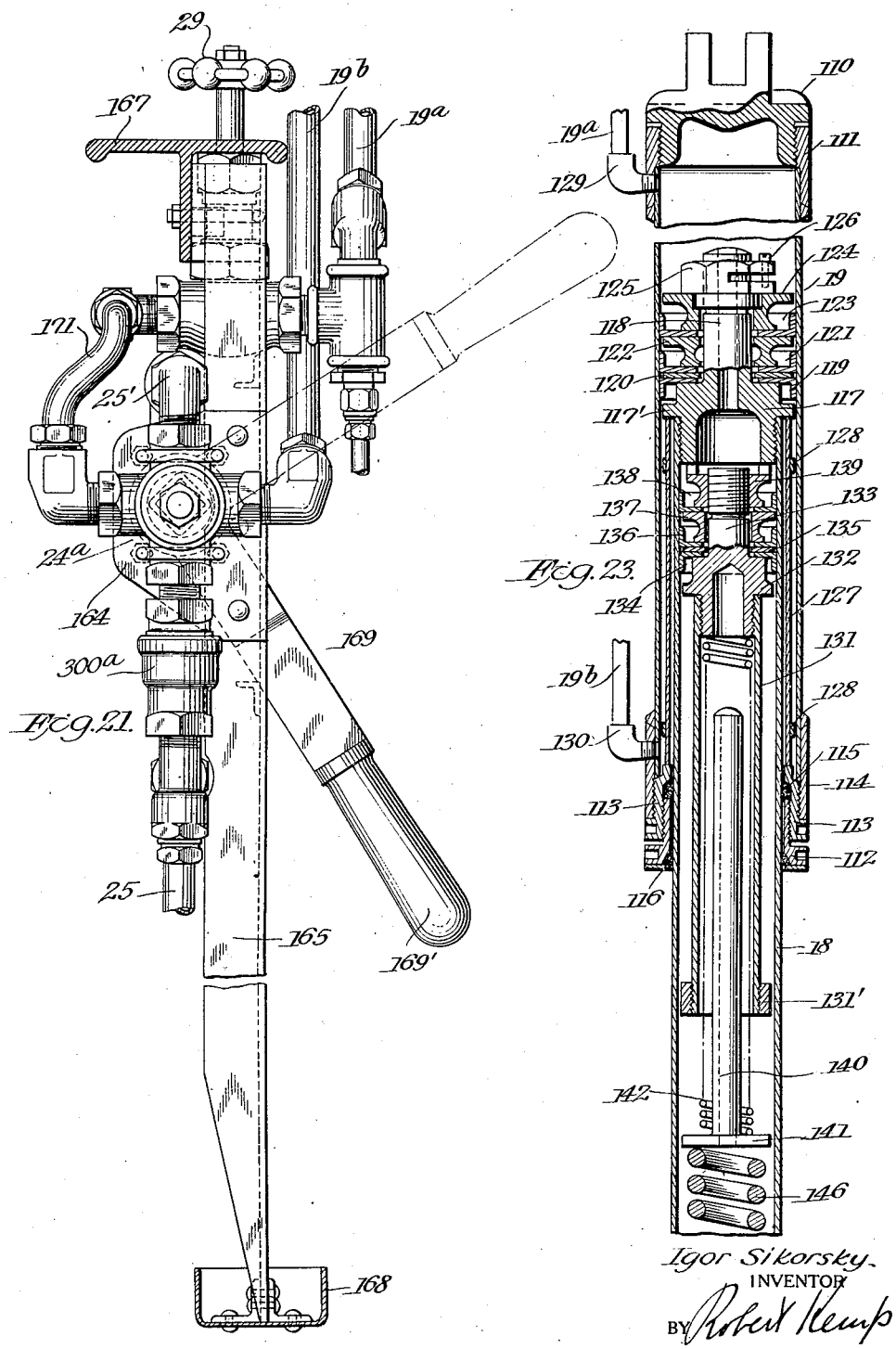
Igor Sikorsky
INVENTOR
BY Robert Kemp
ATTORNEY Oct. 15, 1935.　　　　I. SIKORSKY　　　　2,017,446
AIRCRAFT AND THREE-POINT LANDING GEAR FOR SAME
Filed April 12, 1929　　　13 Sheets-Sheet 10

Igor Sikorsky,
INVENTOR
BY
ATTORNEY

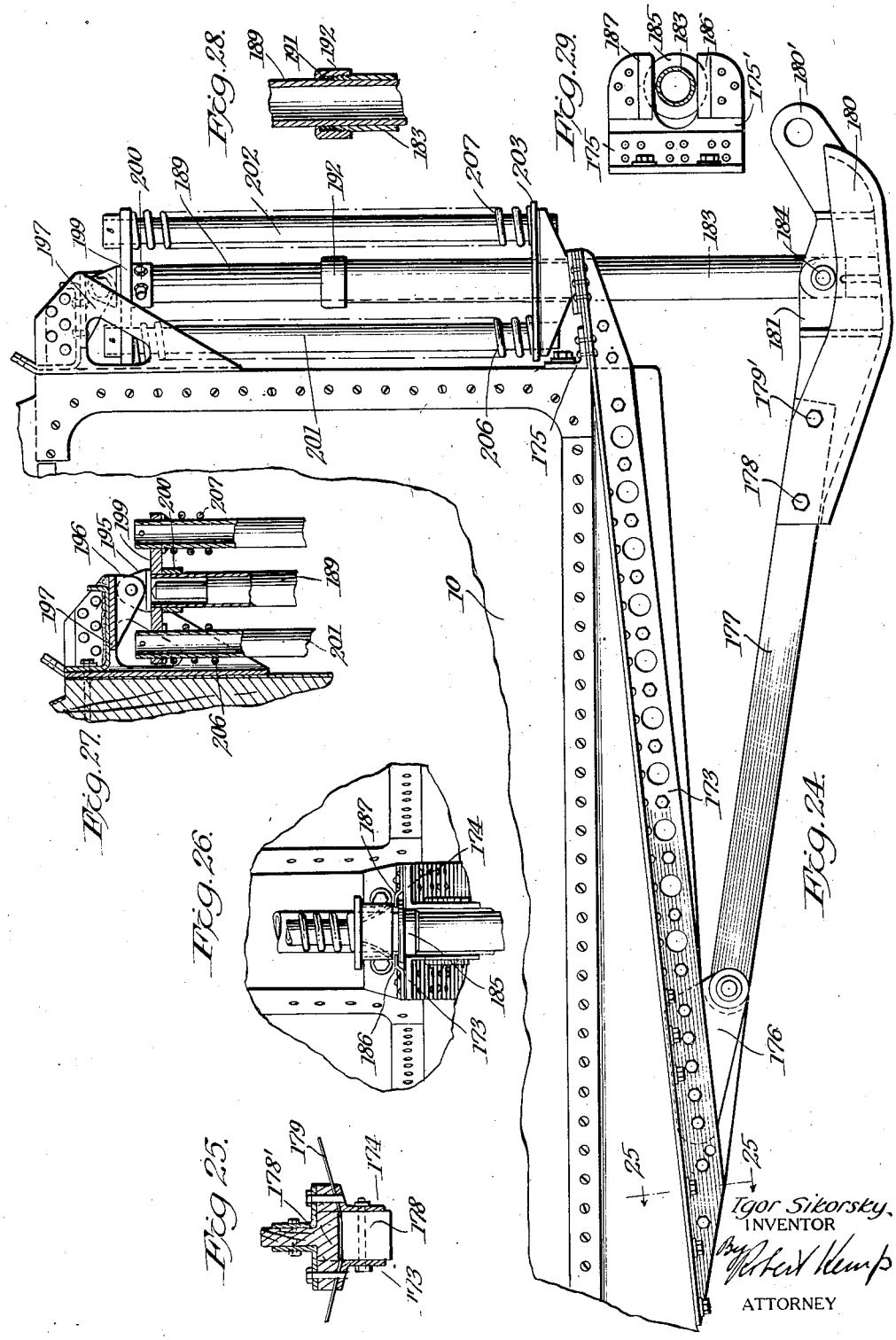

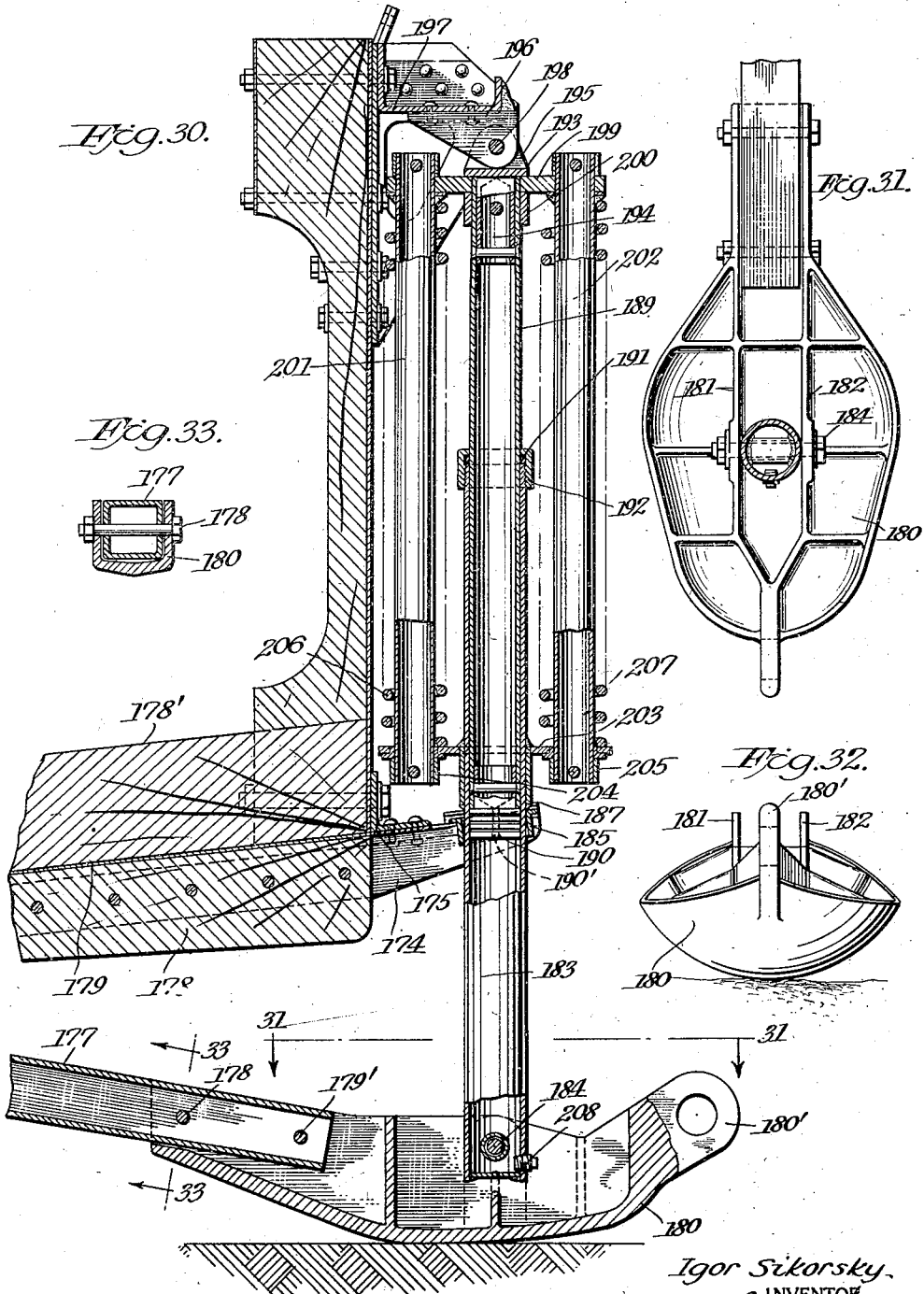

Oct. 15, 1935.  I. SIKORSKY  2,017,446
AIRCRAFT AND THREE-POINT LANDING GEAR FOR SAME
Filed April 12, 1929  13 Sheets-Sheet 13
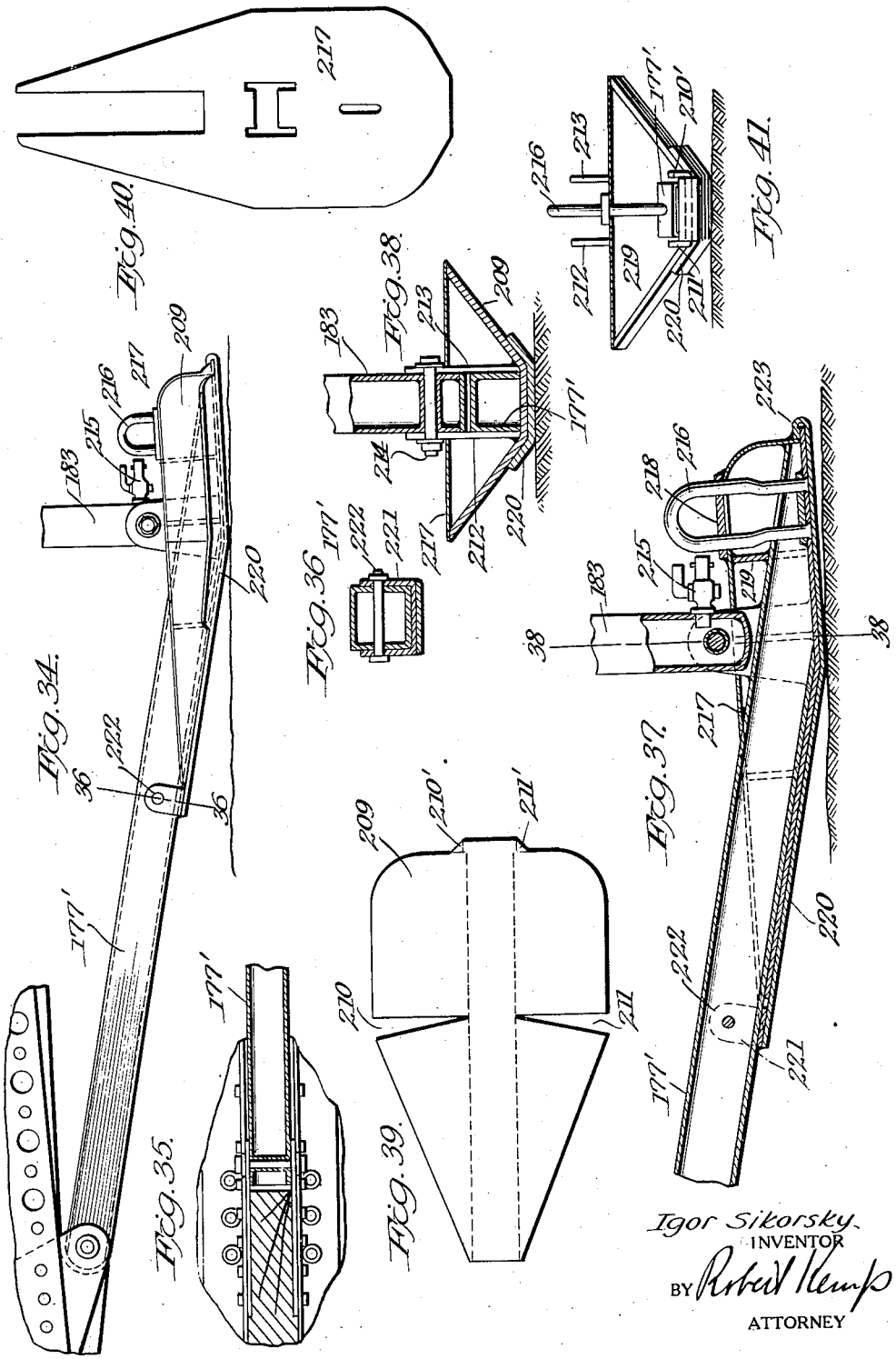
Igor Sikorsky
INVENTOR
BY Robert Kemp
ATTORNEY Patented Oct. 15, 1935

2,017,446

UNITED STATES PATENT OFFICE 2,017,446

AIRCRAFT AND THREE-POINT LANDING GEAR FOR SAME

Igor Sikorsky, College Point, N. Y., assignor, by mesne assignments, to United Aircraft Corporation, a corporation of Delaware Application April 12, 1929, Serial No. 354,552

12 Claims. (Cl. 244—2)

The present invention relates to landing gear for aircraft, and particularly to landing gear of the three point type. The principal object of the invention is to provide a landing gear of this type so constructed that upon contact with the ground in alighting or in taxiing over the ground, the least possible shock will be transmitted to the aircraft.

With this main object in view, I provide hydraulically cushioned landing means at all three points. Preferably, wheels form the two forward points and a skid the third point, but it will be understood that skids or the like might be substituted for the wheels, and that the tail skid may be provided with a drag shoe or with a wheel. Throughout the present specification, I shall refer to landing wheels and a tail skid, but it will be understood that these terms are used merely for the sake of convenience.

The tail skid and wheel supports represent common characteristics, in that each consists of a member directly pivoted at one end to a structural member of the aircraft, and connected to the aircraft structure at its other end through a substantially vertically extending spacer. In each instance, the spacer is of telescopic construction and the telescopic members are collapsible against hydraulic pressure. Each of the spacer members thus constitutes a shock absorber. The spacer members for the landing wheels are collapsible or extensible by means of a hydraulic actuating system and thus, in addition to the function of the shock absorber, act as wheel retracting and projecting devices.

The invention not only includes the arrangement of the wheel supports and tail skids relative to the aircraft structure, but also specific structural features of the component mechanisms.

I have used the term "aircraft" above in its broadest sense, but since the structure to be described and claimed is particularly applicable to aircraft of the land-water-air type, the invention will be described with reference to an amphibion.

The present application is a continuation in part of my copending application Serial No. 314,585, filed October 24, 1928.

In the accompanying drawings,

Fig. 1 is a front elevation of an amphibion with its landing wheels in operative position.

Fig. 2 is a front elevation of the same showing the landing wheels in inoperative position, and the buoyant members operative.

Fig. 3 is a diagram showing the landing wheel shock absorbing and control mechanism.

Fig. 4 is a plan view of an amphibion in some detail, the arrangement of the wheel supporting mechanism being somewhat different from that shown in Figs. 1 and 2.

Fig. 5 is a front elevation of the amphibion of Fig. 4.

Fig. 6 is a side elevation of the same amphibion.

Fig. 7 is an enlarged front elevation of the central portion thereof.

Fig. 8 is a section on line 8—8 of Fig. 7.

Fig. 9 is an enlarged partial side elevation of the amphibion.

Fig. 10 is an enlarged front elevation of the amphibion with parts removed.

Fig. 11 is an enlarged front elevation of the left hand landing wheel and its supporting mechanism with parts in section and parts broken away.

Fig. 12 is a partial plan view of a wheel supporting frame.

Figs. 13, 14 and 15 are details of the frame in section.

Fig. 16 shows a detail in face view.

Fig. 17 is an enlarged front elevation of the left central portion of the amphibion, partly in section, showing the hydraulic wheel control system.

Fig. 18 is a diagram of the complete system.

Fig. 19 is a plan view of a pressure generating pump.

Fig. 20 is a side elevation of the pump of Fig. 19, partly in section.

Fig. 21 is a side elevation of the valve control interposed in the hydraulic system.

Fig. 23 is an axial section through a telescopic wheel supporting member.

Fig. 24 is a side elevation of a tail skid and supporting means therefor in connection with the stern of the body boat of the amphibion.

Fig. 25 is a section on line 25—25 of Fig. 24.

Fig. 26 is a partial elevation taken from the right of Fig. 24.

Fig. 27 is a sectional view of the upper portion of the body boat and of the tail skid supporting mechanism.

Fig. 28 is a longitudinal section through the telescoping members comprised in the tail skid mounting.

Fig. 29 is a plan view of a guide bracket for the telescoping members, one of the latter being shown in cross-section.

Fig. 30 is a section on a longitudinal vertical plane of the rear end of the body boat, the tail skid and its associated cushioning means.

Fig. 31 is a section on line 31—31 of Fig. 30.

Fig. 32 is a rear elevation of a tail skid shoe shown in Figs. 24, 30 and 31.

Fig. 33 is a section on line 33—33 of Fig. 30.

Fig. 34 is a side elevation of a modified form of tail skid.

Fig. 35 is a longitudinal section of the skid of Fig. 34 and adjacent portion of the body boat.

Fig. 36 is a section on line 36—36 of Fig. 34.

Fig. 37 is a vertical longitudinal section of the rear portion of the tail skid of Fig. 34.

Fig. 38 is a section on line 38—38 of Fig. 37.

Fig. 39 is a plan view of a blank from which the main body of the tail skid shoe of Figs. 34 and 37 is formed.

Fig. 40 is a plan view of a cover plate for the tail skid shoe, and

Fig. 41 is a rear view of the shoe partly in section.

Figure 22:
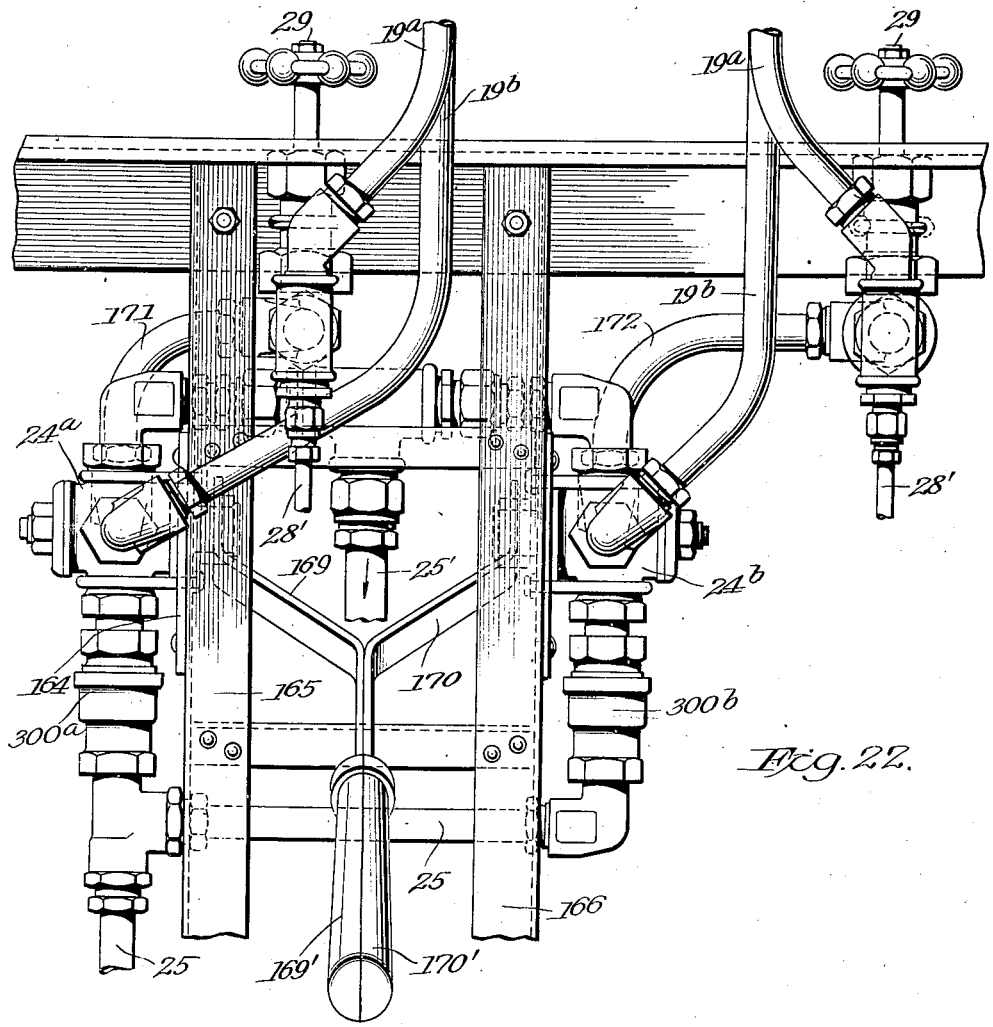
Fig. 22 is a front elevation of the same.

Referring first of all to the showings of Figs. 1 to 3, A is the main wing of an amphibion, and positioned therebelow is a body boat B from which lower wings C and D spring laterally and support at their outer ends pontoons E and F. The landing wheels are indicated at G and H, and are supported on axles $G^1$ and $H^1$ extending laterally of the body boat and pivoted thereto for swinging movement in vertical planes. Rods $G^2$ and $H^2$ are pivoted at their lower ends to the outer ends of axles $G^1$ and $H^1$, these rods having at their upper ends piston heads working in cylinders $G^3$ and $H^3$, the latter being pivoted at their upper ends to the main frame structure.

Means are provided whereby hydraulic pressure may be introduced into cylinders $G^3$ and $H^3$ above the respective pistons therein, so that rods $G^2$ and $H^2$ will be moved to and/or maintained in the position shown in Fig. 1 with wheels G and H in landing position. Conversely, hydraulic pressure may be introduced into the cylinders below the piston heads so that rods $G^2$ and $H^2$ will be drawn inwardly of the cylinders, thereby moving the wheels into the inoperative position shown in Fig. 2, wherein they lie in substantially horizontal planes immediately in advance of the lower wings. As illustrated, axles $G^1$ and $H^1$ have their body-attached ends bent upwardly from their wheel supporting portions, which latter, of course, lie in substantially horizontal planes when the wheels are in operative position.

The hydraulic operating medium serves the additional purpose, through means particularly described and claimed in my above mentioned prior application, of shock absorbing means when the machine is landed on the ground or is taxied thereover. A modified form of cushioning mechanism, still hydraulically controlled, however, will be described hereinafter.

Fig. 3 shows diagrammatically a hydraulic control system for the wheel retracting and projecting mechanism. According to this figure, K represents a supply tank containing the hydraulic medium, such as oil, glycerine or the like. The reference character $K^1$ indicates the outlet line from the tank, while $K^2$ indicates the return line. A hand pump $K^3$ is interposed in line $K^1$, and when it is actuated liquid may be forced through four-way valve L either through branch M into line $M^1$ or branch N into line $N^1$. If line $K^1$ is connected into branch M, branch N will be connected through the four-way valve into return line $K^2$, and liquid will be forced into cylinders $G^3$ and $H^3$ above the piston heads therein, thereby projecting rods $G^2$ and $H^2$, while liquid in the cylinders at the lower sides of the pistons will be forced through line $N^1$, branch N, valve L and line $K^2$ to the reservoir K. Upon complete projection of rods $G^2$ and $H^2$, the ports of valve L are lapped so that the return of the liquid through line $M^1$ and branch M is prevented and the rods are maintained in their projected position. By proper manipulation of valve L, liquid may be forced into the cylinders below the pistons, and an outlet established through line $M^1$, branch M, valve L and line $K^2$. Upon thus retracting the rods, the valve ports may again be lapped so that the rods will be maintained in retracted position.

If desired, a power pump can be substituted for hand pump $K^3$ or added as a second part. The matter to the left of the hand pump in Fig. 3 illustrates a power pump arrangement. At O is a power pump driven by a propeller $O^1$. With this wind driven pump, the hand pump is still useful for such operations, as may be required, while the aircraft is at rest, and the hand pump will also be useful in case of failure of the power pump during flight. Being wind driven, the pump will ordinarily be in operation at all times during flight and, consequently, a by-pass $O^2$ controlled by a valve $O^3$ is interposed between intake line $O^4$ and outlet line $O^5$, which are in connection with line $K^1$ at either side of pump $K^3$. Valve $O^3$ is normally open so that the operation of pump O has no effect ordinarily, except to circulate fluid through the by-pass.

Also connecting the inlet and outlet ports of the power pump is a second by-pass $O^6$ normally closed by the automatic valve $O^7$, this valve being normally held closed by a spring which permits it to open and thereby provide a direct path from the outlet to the inlet port of the power pump should the pressure of the fluid at the outlet of the pump become excessive at any time. A check valve $O^8$ prevents the passage of fluid toward the reservoir.

The operation of the device by means of pump O is as follows: Valve L having its ports lapped, that is to say closed, valve $O^3$ will be open and under the influence of the pump liquid is simply circulated through lines $O^4$ and $O^5$, and by-pass $O^2$. If it is desired to retract the wheels, valve L will be adjusted as above described, and valve $O^3$ closed. Consequently, liquid will be fed through line $O^5$ into line $K^1$ and thence through valve L into line $N^1$, pump $K^3$ being of a positive pressure type which will prevent back flow therethrough.

Valve $O^7$ acts as a safety device to prevent bursting of pipes should valves L and $O^3$ be improperly manipulated. Should pump $O^3$ fail, or should it be out of operation, hand pump $K^3$ may be used as above described, the non-return valve $O^8$ preventing useless circulation through pump O.

Figs. 4 to 6 show, as a whole, an amphibion of preferred form. In these figures, 11 is a main plane and 12 lower planes springing laterally of a body boat 10 disposed beneath the main plane. Outriggers 13 extending rearwardly of the center plane section of main plane 11, support at their outer ends an empennage assembly 14, the outriggers, planes and body boat being joined together by a suitable system of struts. Motors $10^a$ and $10^b$ are suspended below the center section of plane 11, and cylinders 19 are in pivotal connection with the center section through means supported by the motor supporting frames, as will be hereinafter described. Wheels 15 are supported on axles 17 (see also Figs. 7 and 8) and rods 18 are pivoted to the outer ends of axles 17, and at their upper ends are provided with pistons working in cylinders 19. Rear landing gear mechanism, or, a tail skid is designated by numeral 24Ø.

Axle 17 has secured thereto members 16 and 16' forming a triangular bracing frame, the whole being pivotal about substantially horizontal pivots 17'. Here again, it will be noted that axles 17 are of angular form so that their wheel supporting portions lie in horizontal planes substantially below their points of pivotal attachment to the body boat.

At 2Ø is indicated a tank containing a supply of the hydraulic medium. Tank 2Ø is connected by means of the conduit 21 to a pressure generating device 22 adapted to be actuated by a lever 23. Reference character 25 denotes a supply line leading from the pump 22 to a distributor 24, and 25' denotes a return line leading from the distributor. Lines 19a lead from the distributor to the upper ends of cylinders 19 and lines 19b lead from the distributor to the lower ends of cylinders 19, the distributor comprising valves so arranged as to direct the supply to lines 19a either singly or separately, or to lines 19b either singly or separately so that wheels 15 may be independently controlled. Lines 19a and 19b are lead upwardly through a stream line housing 26 and laterally through branch housings 26'.

In the amphibion as illustrated, two motors are provided, these being laterally and symmetrically spaced relative to the body boat. In case of failure of one of the motors, an unsymmetrical tractive force is exerted on the amphibion. If the machine is being propelled in the water by only one motor, the distortive effect may be compensated by lowering the wheel beneath the operative motor to a suitable extent. The increased drag on that side of the boat will relieve the vertical rudder and leave it free and more effective for steering purposes.

It will be noted from Fig. 8 in particular that the pilot's compartment generally indicated by the reference numeral 3Ø, is provided with two chairs 38 placed side by side. Since the control arrangements and devices have been particularly described and claimed in my Patent No. 1,916,444, it will suffice here to state that the reference numerals 61 indicate the engine control levers, 33 indicates levers cooperating with segments 35 to adjust the seats to various heights and retain them in adjusted position, 62 indicates means for controlling the adjustment of the stabilizer and 68 indicates the aileron and elevator control member, which has a pivoted extension 63 so supported that it may be swung to bring wheel 6Ø in front of either chair 38.

I have described generally above the amphibion structure and the retractible landing wheels and associated devices. I shall now proceed to describe with some particularity the various elements constituting the invention.

I have mentioned that cylinders or tubular members 19 are in pivotal connection with the main plane 11 through the motor supporting means. The motor supporting frames are particularly shown in Figs. 9, 10 and 17. Since the two frames are identical, it will suffice to describe one of them, and reference will be had to the left hand frame shown in Figs. 9 and 17.

As will be seen from these figures, the frame comprises a circular head 7Ø which is preferably formed from an L-bar bent to proper shape and its ends welded together. Four U-bars 71, 72, 73, 74, extend rearwardly of head 7Ø in pyramided formation. The forward ends of these bars are rigidly secured to head 7Ø, and their rearward ends are connected to a block 75. Head 7Ø has four ears projecting therefrom, the ears being arranged in pairs at each side of the top center of head 7Ø, and to them are secured the lower ends of struts 76, 77, 78 and 79, the top ends of the latter being secured at spaced points to ears secured to and projecting downwardly from the front spar 8Ø of the main plane. Struts 76 to 79 are in substantially the form of a W, and their lower ends project forwardly of front spar 8Ø so that head 7Ø is positioned somewhat in advance of the latter.

Two struts 81 and 82, Fig. 10, are secured at their upper ends to the reinforced portion of spar 8Ø, and their rearwardly projecting lower ends are secured to block 75. Struts 81 and 82 are in substantially V-relation, and their upper ends may be secured to the same ears to which the upper ends of struts 76 and 79 are secured. A compression member 83, Fig. 9, is interposed between block 75 and the rear spar 84 of main plane 11, reference character 85 denoting generally a compression member interposed between the front and rear spars.

A plate 86, Figs. 9 and 17, is secured to bars 72 and 73, and has mounted centrally thereof a block 87. A strut 88 is secured at its upper end to the lower portion of spar 8Ø, and its lower end extends vertically downwardly through a guide aperture formed in block 87 and a registering aperture in plate 86. Strut 88 is thus supported in a fixed position with its lower end positioned in the space between rods 71 to 74. The lower end of strut 88 is provided with a knuckle in which is pivotally engaged a flange provided on the top cap of member 19.

Members 88, 18 and 19 constitute in effect a linkage system whose members are in substantial alignment when wheel 15 is in operative position. The lower portion of this linkage system includes the telescopic members 18 and 19 which, upon contraction, are moved out of alignment with member 88 into the dotted line position of Fig. 17, wherein wheel 15 assumes a position in front of and below lower wing 12. The central portion of motor 1Øb and its supporting frame are enclosed in a stream line housing 89 through a slot 89' of which member 19 is passed for free oscillation.

In Figs. 11 to 17, I have particularly illustrated the wheel supporting means.

Tubular axle 17 supports at its inner end a knuckle 9Ø having a shank extending within the axle member, and member 16 supports at one end a substantially similar knuckle 91 and at its other end a knuckle 92. An eye bolt 92' engaged with knuckle 91 is secured to axle 17 immediately to the rear of its wheel supporting portion, and likewise secures to the axle a collar 93 having a radial flange 94. Knuckles 9Ø and 92 are pierced with bolts 9Ø' and 92', and they are pivoted to stanchions 95 and 96 which are secured to the body boat 1Ø, there being a transverse frame member as at 97, Fig. 10, extending between the stanchions at opposite sides of the body boat.

A member 16' joins the inner ends of axle 17 and member 16, the members being secured together by means of clips 98 and 99, an angle bracket 99' bracing members 16' and 17.

Wheel 15 has an internal cup-member 101 with which is adapted to cooperate a brake band mounted on an expansion member 102, which is supported on an annular plate 103 which in turn has its inner margin bolted to the outer margin of flange 94 by means of bolts 103'. Collar 93 which supports flange 94, is secured against rotation by bolt 92 and also by keys 93'.

An operating cable 104 is led through an aperture 105 in plate 103, and has its end secured to an operating lever 106 for the expansible member 102. Cable 104 is led to the pilot's compartment through a flexible conduit 107, which has an end nipple 108 secured in a collar 109 surrounding aperture 105.

Cable 104 and its flexible housing conduit 107 may be lead to the pilot's compartment either through hollow axle 17 or it may be trained along the outside of the latter. In either event, the wheels may be moved from operative to inoperative position and vice versa without affecting the brake or its operating mechanism.

Cylinder 19, Figs. 11 and 23, is closed at its upper end by means of a cap 110 which, as has heretofore been mentioned, is provided with means for pivotal attachment to the lower end of strut 88. The cap is in threaded engagement with a sleeve 111 welded to the upper end of member 19. Member 18 is tubular, and passes into the lower end of cylinder 19 through a plurality of nested sleeves 112, 113 and 114, the latter of which is welded to the lower end of member 19. Reference character 115 and 116 denote packings, the former being compressible when member 112 is screwed inwardly of member 113.

Member 18 has screwed into its upper end the threaded skirt of a plug 117, the skirt being terminated upwardly by a radial flange 117' which sets on the upper edge of member 18 and extends therebeyond. Plug 117 has a central upwardly extending hollow stud 118 screw threaded at its upper end, and disposed on this stud are a downwardly faced packing cup 119, a washer 120, an upwardly faced cup 121, a washer or spacer 122, a second upwardly faced cup 123, a spacer 124 and a nut 125 with a locking device 126. A sleeve 127 is interposed between flange 117' of plug 117 and the inner end of sleeve 113. Sleeve 127 is maintained in concentric relation with member 18 by means of lugs 128 which are in substantial contact with the inner surface of cylinder 19. Sleeve 127 serves to limit the movement of member 18 outwardly of member 19.

Tube 19ᵃ communicates with the upper end of cylinder 19 through a connection 129, and tube 19ᵇ is in connection with the lower end of the cylinder through a connection 130.

Inwardly of member 18 is a tubular member 131 having screwed into its upper end the externally threaded skirt of a plug 132 having a radial shoulder portion abutting the upper edge of member 131. Plug 132 has an upwardly extending stud 133 carrying a downwardly faced packing cup 134, a washer 135, an upwardly faced packing cup 136, a washer or spacer 137, a second upwardly faced cup 138 and finally an upwardly castellated nut 139. Member 131 is provided at its lower end with a spacer ring 131'.

Projecting inwardly of member 131 is a pin 140 having a radially flanged portion 141 at its lower extremity. Normally flange 141 is disposed substantially below the lower extremity of member 131, and the upper end of pin 140 is disposed substantially a like distance below the upper extremity of an axial bore in the lower portion of plug 132. Members 140 and 132 are ordinarily yieldingly maintained in this relation by means of a helical spring 142 interposed between the plug and flange or seat 141.

The lower end of member 18 is closed by means of a cap 143 having an ear 144 pivotally engaged in a knuckle member 145 secured in the outer end of axle 17. A spring 146 of considerably greater strength than spring 142 is interposed between cap 143 and seat 141. The operation of the described arrangement is as follows:

When, for example, the machine is landed on the ground the shock, great or small, has the effect of moving member 18 inwardly of cylinder 19. This means that there is a tendency for the piston at the end of piston rod 18 to compress the fluid thereabove in cylinder 19. This pressure causes the fluid to pass downwardly through the bore of stud 118 and to impinge against the piston at the upper end of member 131, causing the latter to move downwardly against the force of spring 142. If the landing has been particularly rough, spring 142 will be compressed until the lower extremity of member 131 meets seat 141, whereupon further movement of member 131 is positively transmitted to the relatively strong spring 146. Upon release of the pressure, springs 142 and 146 again expand, moving the parts to the position shown in Fig. 23, and expelling the liquid from member 18 through hollow stud 118 into the top of the cylinder. It will be understood that fluid introduced into the cylinder through tube 19ᵃ will move the main piston and therewith rod 18 downwardly, while liquid introduced through tube 19ᵇ will move the main piston upwardly, thereby through the intermediary of rod 18 retracting wheel 15.

It will be seen from the above that I have provided a shock absorber adapted first of all to resist relative movement of its parts through a relative weak compression device, and to resist extreme movement of its parts by a relatively strong compressible device to which force is positively transmitted.

In Fig. 18, I have shown diagrammatically the hydraulic control system for the landing wheels. As has already been described in connection with Fig. 8, reference character 20 indicates a supply tank for the hydraulic medium, and 21 a line leading from the tank to the double action pump 22 and supply line 25, and also in connection with return line 25'. Line 25 has two branches each leading to a four-way valve 24ᵃ or 24ᵇ. With the valves in the position shown in Fig. 18, line 25 is in connection with lines 19ᵃ and also with instrument board gauges 28 through globe valves 29. Lines 19ᵇ are in connection with line 25' through valves 24ᵃ and 24ᵇ. When cylinders 19 have been filled with liquid, the latter may be retained therein either by check valves 300ᵃ and 300ᵇ, by lapping valves 24ᵃ and 24ᵇ, or by closing valves 29. It will be noted, however, that all of these valves are independently operable, so that the hydraulic medium may be supplied to cylinders 19 either singly or together, so that the landing wheels are independently controlled.

As is shown in Figs. 19 and 20, the pressure generating device comprises a pair of aligned cylinders 147 and 148 secured in opposed relation on a base plate 149. A plunger 150 is common to both of cylinders 147 and 148 and works in the latter through packing gaskets, as at 151, Fig. 20, compressible by means of threaded rings 152 and 153. A clip 154 is secured to the medial portion of plunger 150, and has an upwardly extending portion to which is secured one end of a link 155. The other end of link 155 is pivoted to an arm 156 secured to an angular foot portion of lever 23 journalled in stanchions 158 and 159, which are secured to the base plate. Oscillation of the lever thus reciprocates plunger 150 in cylinders 147 and 148. Due to the effect of check valves 160, 161, 162 and 163, upon operation of lever 23, liquid is drawn from line 25', and also line 21, if necessary, and discharged into line 25. Base plate 149 is secured to the floor in the pilot's compartment so as to bring lever 23 within convenient reach of the pilot, as is indicated in Fig. 8.

The relative arrangement of valves 24ª and 24ᵇ is illustrated in Figs. 21 and 22. According to these figures, the valves are supported on brackets as at 164, which latter are supported on uprights 165 and 166 extending between transverse structural members 167 and 168 of the body boat. Each valve has an operating handle 169 or 170 whose outer ends, Fig. 22, are so bent as to bring them into substantial contact with each other. Lever 169 is provided with a half handle 169' and lever 170 with a half handle 170', the two lying closely together so that while they may be readily grasped simultaneously by the hand of the operator, they may also be operated independently.

Referring to valve 24ª, the bottom port is in connection with supply line 25, the forward port in connection with line 19ᵇ, the rearward port through a connection 171 and globe valve 29 with tube 19ª, and the top port is in connection with return line 25'. The connections are the same for valve 24ᵇ, a connection 172 being interposed between the rear port of the latter and the associated globe valve 29. Tubes 28 are in connection with tubes 19ª at the outlet side of the globe valves, these tubes leading to the gauges 28 on the instrument board. Thus, whether pressure is being applied to lines 19ª or whether valves 29 are closed, the gauges will always be in operative connection with lines 19ª so that the pilot may be apprised of the pressure existing therein. Check valves opening when liquid is forced upwardly and closing when liquid is forced downwardly are shown respectively at 300ª and 300ᵇ. It will be remembered that lines 19ª lead to cylinders 19 above the piston heads therein.

When levers 169 and 170 are in the position illustrated in full lines in Fig. 21, pressure will be supplied through line 25 to lines 19ª, and lines 19ᵇ will be connected into exhaust lines 25'. If levers 169 and 170 are moved to the dotted line position of Fig. 21, line 25 will be placed in connection with lines 19ᵇ, and lines 19ª will be placed in connection with line 25'.

A tail skid and the supporting means therefor, are shown in Figs. 24 to 33. The stern of body boat 10, is shown in Fig. 24. A pair of angle bars 173 and 174 are disposed along the keel of the body boat at the rear portion thereof, and project somewhat beyond the stern, and are secured to the stern post by means of an angle bracket 175. A pair of plates, one of which is shown at 176, Fig. 24, are secured to the front portions of members 173 and 174, and pivotally support between them the front end of the tail skid 177. In Fig. 25, 178 indicates the keel of the body boat, 179 the outer sheathing, and 178' the keelson.

The rear end of tail skid 177 has secured thereto by means of bolts 178" and 179' a cast shoe 180 of boat shape as may be most clearly seen in Figs. 31 and 32. The shoe is reinforced by means of longitudinally extending ribs 181 and 182 and a number of transverse ribs, the shoe terminating in a perforated ear 180'.

A tubular member 183, closed at its lower end is pivoted between ribs 181 and 182 by means of a bolt 184. The upper portion of member 183 passes between the projecting ends of members 173 and 174, and in the bifurcation of a plate 175' secured on the latter. Member 183 has slidable thereon a radially flanged ferrule 185 whose flange rests on the margins of bifurcated plate 175'. Clips 186 and 187 which take over the flanged portion of the ferrule prevent its vertical displacement, while permitting its sliding movement in the longitudinal direction of the body boat. Transverse movement is prevented by members 173 and 174. A hollow member 189 fits in member 183 in telescopic relation therewith, and has its lower end closed by a piston head 190 provided with a small axial perforation 190'. A gasket 191 is retained on the upper end of member 183 by means of a ring 192. A cap 193 has a shank 194 secured in the upper end of member 189, and an upwardly extending ear 195. Ear 195 is pivotally secured between depending ears 196 of a bracket 197 by means of a bolt 198. A yoke 199 is secured through a central perforation between the lower face of cap 193 and a collar 200 to the upper end of member 189. The yoke carries at its ends downwardly projecting tubular members 201 and 202, which are rigidly secured thereto. At their lower ends, members 201 and 202 are guided in apertures formed in a bracket 203, which is fixed to member 183. Rings 204 and 205 secured to the lower extremities of members 201 and 202 prevent the passage of the latter upwardly through the apertures of bracket 203.

Interposed between yoke 199 and bracket 203, and surrounding members 201 and 202, are a pair of helical springs 206 and 207 which normally hold the parts in the position illustrated in Figs. 24 and 30.

The telescopic members or at least that portion of member 183, normally below piston 190, is adapted to be filled with a fluid which is retained therein by a plug 208 screwed into the filling opening.

Landing shocks imparted to the tail skid cause compression of the liquid in the lower end of member 183 between the end wall of the latter and piston 190. This pressure is relieved by the passage of the liquid through perforation 190', the telescopic movement of parts 183 and 189 being, however, opposed by springs 206 and 207. The two telescopic members, due to the hydraulic medium contained therein function as a shock absorber, the relative movement of the members being permitting by their pivotal connection with the tail skid shoe and with bracket 197, respectively. Oscillation about bolt 198 is not interfered with by guide plate 175', although the latter prevents lateral distortive movement.

As soon as the load is removed from the tail skid, the telescopic members will be expanded by spring 206 and 207, and the liquid which has been expelled from the lower side of piston 190 will be permitted to return under the force of gravity.

In Figs. 34 to 41, I have illustrated another form of tail skid shoe. The forward end of tail skid 177' is supported in the same manner described in connection with Fig. 24. The shoe, however, instead of being cast, is for the sake of lightness built up of plate material. The main body of the shoe is formed from a blank, such as shown in Fig. 39. This blank 209 is provided with lateral cut-outs 210 and 211, and then is bent along the dotted lines to bring the edges of the cut-outs into contact, whereupon they are welded together. A pair of stanchions 212 and 213 are mounted in the shoe thus formed, as shown in Fig. 38, the rear extremity of skid 177' extending between the lower portions of the stanchions, and the lower extremity of member 183 being pivoted between the upper ends of the stanchions by means of a bolt 214. The lower end of member 183 is provided with a filling valve 215. Mounted in the shoe to the rear of the stanchions is a mooring member 216 in the form of an upwardly projecting staple which extends through a slot formed in the extremity of skid 177'. A cover plate 217 of the form shown in Fig. 40, is disposed on the shoe and its margins secured to the upper edges of the latter, the upper ends of stanchions 212 and 213, and staple 216 projecting thereabove. A reinforcing plate 218 initially placed on member 216 is welded to the top of cover member 217, and a reinforcing partition 219 is interposed between the latter and the walls of the shoe.

The shoe thus constructed is finally secured in position by means of a wear plate 220, which extends from end to end of the shoe, and whose lateral bent up margins grip the side walls of the latter. At its forward end, the wear plate has a pair of wings, one of which is indicated at 221, Fig. 37, these wings being secured to member 177' by means of a bolt 222. The rear end of the wear plate is bent upwardly and over the rear margin of the shoe as indicated at 223 to lie between a pair of upstanding ears 210' and 211' integral with the latter.

The wear plate thus serves as a principal means for securing the shoe to the tail skid, and also saves the shoe from wear. It may be readily removed for replacement by removing bolt 222, and unhooking its rear end from the rear end of the shoe.

While I have described the various features of my invention with reference to specific embodiments, it is to be understood that these embodiments are to be considered as illustrative rather than restrictive, and that the scope of my invention is determined in the following claims.

I claim:—

1. In an airplane, a member extending downwardly clear of the airplane supporting surfaces, an axle pivoted at one end to said member for swinging movement about a normally substantially horizontal axis, a landing wheel mounted on said axle, a pair of upwardly extending telescopic members interposed between the outer end of said axle and the airplane supporting surfaces, and means to extend and contract said telescopic members to move said axle and therewith the wheel between operative and inoperative positions.

2. In an amphibion, a body boat, a plane thereabove comprising a plurality of longitudinal frame members, axles pivoted to the body boat at opposite sides thereof for oscillatory movement in transverse vertical planes, landing wheels on said axles adjacent their ends remote from their pivot points, and linkage systems adapted for flexure in transverse planes interposed between one of said frame members and free portions of the respective axles, the members of each linkage system standing in substantial alignment when the wheels are in operative position, each linkage system including a member comprising telescopic elements, and means to contract said telescopic elements to move the members of the linkage system out of alignment and thereby move the axles and therewith the wheels to an upper inoperative position.

3. In an airplane, means extending downwardly clear of the airplane supporting surfaces, an axle pivoted at one end to said means for swinging movement about a normally substantially horizontal axis, a landing wheel mounted on said axle, an upwardly extending telescopic unit pivoted at its lower end to the outer end of said axle and at its upper end to the aircraft super-structure, the pivotal axes of said telescopic unit being parallel to that of the axle, means to extend said unit and maintain it in extended position with the wheel in operative position or to contract said unit to move the axle and therewith the wheel to an inoperative position, said unit swinging freely about its upper pivot during such operations.

4. In an airplane, a member extending downwardly clear of the airplane supporting surfaces, an axle pivoted at one end to said member for swinging movement about a normally substantially horizontal axis, a landing wheel mounted on said axle, an upwardly extending cylinder and piston unit pivoted at its lower end to the outer end of said axle and its upper end to the aircraft super-structure, the pivotal axes of said cylinder and piston unit being parallel to that of the axle, a source of hydraulic fluid under pressure, means to introduce the fluid above the piston to extend said unit and maintain it in extended position with the wheel in operative position, and means to introduce the fluid below the piston to contract said unit to move the axle and therewith the wheel to inoperative position, said unit swinging freely about its upper pivot during such operations.

5. In an amphibion, a body boat, a plane above the body boat, axles pivoted to the body boat at opposite sides thereof for oscillatory movement in transverse planes, landing wheels on said axles adjacent their ends remote from their pivot points, an expansible and contractible unit pivotally suspended beneath the main plane at each side of the body boat and freely oscillable in the transverse planes of said axles, the lower ends of said units being pivoted to the outer ends of the axles respectively, and means to extend and contract said units to project or retract the landing wheels, said units occupying a substantially vertical position when the wheels are in projected position.

6. In an amphibion, a body boat, a plane above the body boat, axles pivoted to the body boat at opposite sides thereof for oscillatory movement in transverse planes, landing wheels on said axles adjacent their ends remote from their pivot points, an expansible and contractible unit pivotally suspended beneath the main plane at each side of the body boat and freely oscillable in the transverse planes of said axles, the lower ends of said units being pivoted to the outer ends of the axles respectively, means to extend and contract said units to project or retract the landing wheels, said units occupying a substantially vertical position when the wheels are in projected position, and a motor suspended from the plane at the upper end of each of said units.

7. In an airplane, a body, a pair of axles pivoted to the body at opposite sides thereof for oscillatory movement in transverse planes, an expansible and contractible unit pivotally suspended from its upper end at each side of the body boat for oscillation in the transverse planes of the axles, pivotal connections between the lower ends of said units and the axle ends, landing wheels on the axles intermediate their points of connection to the body and said units, and means to expand and contract said units to move the wheels to operative and inoperative position.

8. In an aircraft, a body and a pair of retractable shock absorbing landing devices therefor, comprising a pair of ground engaging members, telescopic means embodying piston and cylinder construction for supporting said members in position on said body, a fluid system interconnecting opposite ends of said cylinders, means for controlling the flow of fluid from one end of said cylinders to the other, said means comprising valves adapted in one position to direct fluid simultaneously to the same or opposite ends of said cylinders and in another position to direct fluid to one cylinder independently of the other.

9. In an aircraft, a body and a pair of retractable shock absorbing landing devices therefor, comprising a pair of ground engaging members, telescopic means embodying piston and cylinder construction for supporting said members in position on said body, a fluid system interconnecting opposite ends of said cylinders, means for controlling the flow of fluid from one end of said cylinders to the other, said means comprising independent valves whereby each cylinder may be actuated simultaneously with or independently of the other.

10. In an aircraft, a body and a pair of retractable shock absorbing landing devices therefor, comprising, in combination, a pair of ground engaging members, telescopic means embodying piston and cylinder construction for moving said members between extended operative position and retracted inoperative position, a fluid system interconnecting opposite ends of said cylinders, means for controlling the flow of fluid from one end of said cylinders to the other, said means comprising valves adapted in one position to direct fluid simultaneously to the same or opposite ends of said cylinders and in another position to direct fluid to one cylinder independently of the other.

11. In an airplane, a body, ground engaging members pivotally connected with said body for oscillation in transverse vertical planes, a linkage system for supporting the ground engaging members in operative position, comprising a link connected with the airplane structure and extending downwardly therefrom, telescopic members having pivotal connections at each end and having their upper ends connected with said links and their lower ends connected with members associated with the ground engaging members, and means to expand said telescopic members and place the ground engaging members in operative position and the linkage system in substantial alignment and means to contract said telescopic members and place the ground engaging members in inoperative position.

12. In an airplane, a plane, a member extending downwardly and clear of the plane, an axle pivoted at one end to said member for swinging movement about a normally substantially horizontal axis, a landing wheel mounted on said axle, a pair of upwardly extending telescopic members, means securing the lower telescopic member to said axle at a point remote from the pivotal axis of the latter, means securing the upper telescopic member to said plane, hydraulic means to extend said telescopic members and means to yieldingly maintain said members in extended relation with the wheel in operative position or to contract said telescopic members to move the axle and therewith the wheel to inoperative position.

IGOR I. SIKORSKY.